United States Patent [19]
Ma et al.

[11] Patent Number: 5,729,478
[45] Date of Patent: Mar. 17, 1998

[54] NOTEBOOK COMPUTER WITH INSERTABLE EXPANSION DEVICES

[76] Inventors: Hsi-Kuang Ma, 4F, No. 48, Sec. 2, Chung Cherng Rd., Taipei; Yung-Fa Cheng, 3F, No. 8, Alley 2, Lane 30, Deng Gong Rd., Dan Shui, Taipei Hsien, both of Taiwan

[21] Appl. No.: 567,105

[22] Filed: Dec. 4, 1995

[30] Foreign Application Priority Data

Nov. 13, 1995 [CN] China .................. 95224641.4

[51] Int. Cl.⁶ ........................................ G06F 1/16
[52] U.S. Cl. ........................... 364/708.1; 361/683
[58] Field of Search ................. 364/708.1; 361/679, 361/683, 686

[56] References Cited

U.S. PATENT DOCUMENTS

| | | | |
|---|---|---|---|
| 4,769,764 | 9/1988 | Levanon | 364/708 |
| 4,788,658 | 11/1988 | Hanebuth | 361/685 |
| 4,926,365 | 5/1990 | Hsieh | 361/685 |
| 5,058,045 | 10/1991 | Ma | 364/708.1 |
| 5,097,388 | 3/1992 | Buist et al. | 361/685 |
| 5,159,533 | 10/1992 | Kuang | 361/685 |
| 5,175,671 | 12/1992 | Sasaki | 361/685 |
| 5,264,986 | 11/1993 | Ohgami | 361/685 |

*Primary Examiner*—Tan V. Mai
*Attorney, Agent, or Firm*—Bacon & Thomas

[57] ABSTRACT

A notebook computer with insertable expansion devices includes a motherboard, a display and a keyboard, wherein the notebook computer is provided with an expansion notch in a rear end thereof and an expansion connector at an inner wall of the expansion notch. The expansion connected is connector to the motherboard of the notebook computer.

2 Claims, 2 Drawing Sheets

NOTEBOOK COMPUTER WITH INSERTABLE EXPANSION DEVICES

BACKGROUND OF THE INVENTION (a) Field of the Invention

The present invention relates generally to a notebook computer, and more particularly to a notebook computer with insertable expansion devices.

(b) Description of the Prior Art

Portable notebook computers are very popular today since they provide considerable convenience.

Due to their compact size, notebook computers may have to be connected to external devices in order to work properly or to perform more functions. For instance, since the built-in battery can only supply power to the notebook computer for a short period of time, the notebook computer is normally connected to an additional AD/DC adapter when it is used indoors so as to obtain a longer and more stable supply of power. Adapters may soon become hot during use, and it is difficult to install them directly into the notebook computer.

Besides, there are also the problems of expansion and connection with notebook computers. A conventional method is to provide a connector at a rear side of the notebook computer so as to connect the notebook computer to an expansion box externally, as shown in FIG. 1. However, it is inconvenient to carry accessories such as expansion boxes, particularly when most expansion units each have only single function.

SUMMARY OF THE INVENTION

Accordingly, a primary object of the present invention is to provide a notebook computer with insertable expansion devices.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
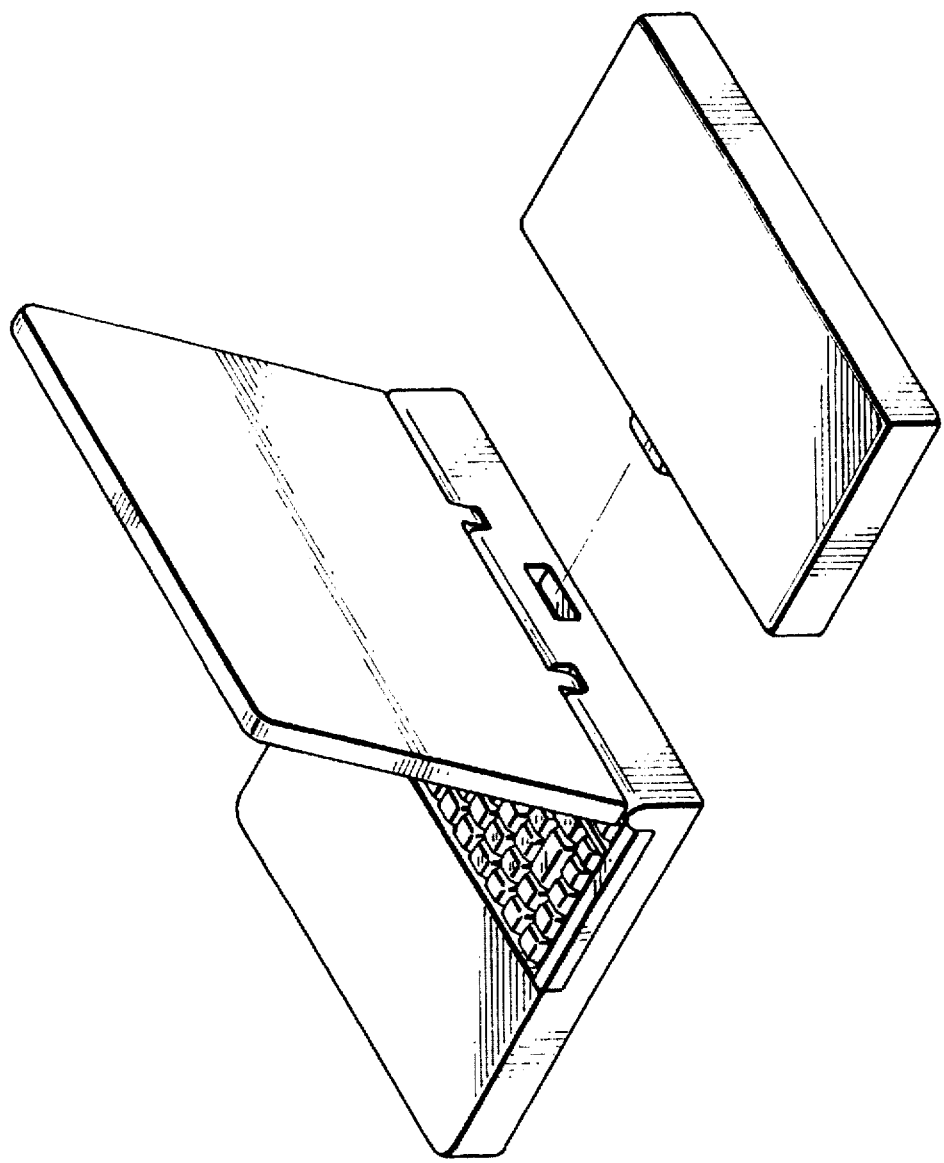
FIG. 1 is a perspective view of a conventional notebook computer connected to a conventional expansion box.
Figure 2:
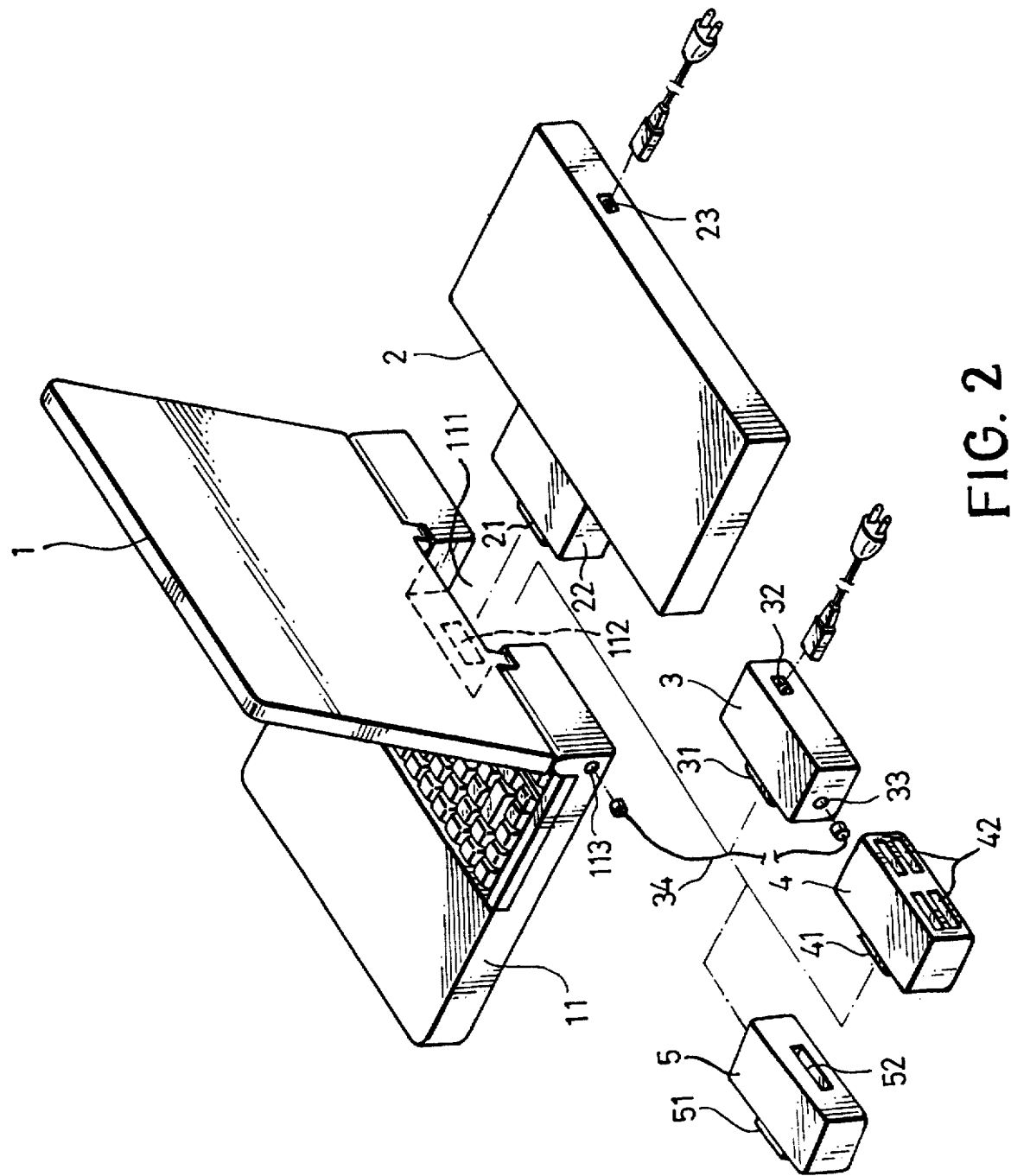
FIG. 2 is a perspective exploded view of a preferred embodiment of the present invention.

With reference to FIG. 2, the present invention essentially comprises a notebook computer 1, an expansion connecting device 2 connectable or insertably coupled to the notebook computer 1, a power supply device 3, a replicator 4 and an expansion device 5.

The notebook computer 1 is a standard notebook computer with a motherboard, a display and a keyboard. Unlike existing notebook computers, the notebook computer 1 is additionally provided with an expansion notch 111 formed in a rear side of a body 11. An expansion connector 112 is provided in an inner wall of the expansion notch 111 and is connected to the motherboard inside the body 11.

The expansion connecting device 2 is a known standard an expansion connecting box in which expansion unit such as a floppy disk drive, a hard disc, an optical disk drive, and a modem may be optionally installed therein. The expansion connecting device 2 is further provided with an electrical socket 23 which may be externally connected to an electrical plug means to obtain a power supply. Besides, all the expansion units accommodated within the expansion connecting device 2 are connected to a connector 21 the size of which corresponds to that of the expansion connector 112 so that they may be coupled together. A salient feature of the invention is that a case 22 is arranged to project from a body of the expansion connecting device 2 and is located between the body and the connector 21, the case 22 having a size matching that of the expansion notch 111 so that it can fit thereinto.

The power supply device 3 is a box structure having a size matching that of the expansion notch 111 and being internally provided with rectifying, voltage-dropping and charging circuits. It is configured to have a connector 31 extending from a front end of a box body for coupling with the expansion connector 112 when the power supply device 3 is inserted into the expansion notch 111 so as to supply power to the notebook computer 1. The box body of the power supply device 3 is further provided with an electrical socket 32 for receiving an electric plug means so as to obtain power supply.

The replicator 4 is also a box structure having a size matching that of the power supply device 3 for insertion into the expansion notch 111 and being internally provided with suitable circuits. Likewise, a connector 41 is provided at a front end of a box body of the replicator 4 for coupling with the expansion connector 112. The replicator 4 is additionally provided with a plurality of slots 42 for connection with peripherals such as the keyboard, printer, display and mouse.

Similarly, the expansion device 5 is a box structure having a size matching that of the power supply device 3 for insertion into the expansion notch 111. A connector 51 is also provided at a front end of a box body of the expansion device 5 for coupling with the expansion connector 112. In additions the expansion device 5 is provided with proper circuits and has a slot 52 formed in a rear end thereof for receiving an expansion cartridge so as to expand the functions of the notebook computer 1.

In use, the connector 21 of the expansion connecting device 2 is inserted into the expansion connector 112 so as to expand the functions of the notebook computer 1. In order to connect the notebook computer 1 to indoor power source, the expansion connecting device 2 may be removed from the notebook computer 1 and the power supply device 3 may be joined thereto, and the power supply device 3 will not increase the size of the notebook computer 1 when it is inserted into the expansion notch 111. Likewise, the replicator 4 may be fitted into the expansion notch 111 to be further connected to external peripherals so as to expand the functions of the notebook computer 1, and the expansion device 5 may also be inserted into the expansion notch 111. An expansion cartridge may then be inserted into the slot 52 of the expansion device 5 after it is properly joined to the notebook computer 1.

In another example, the notebook computer 1 may be connected to the power supply device 3 as well as one of the other devices so as to expand the functions thereof. Instead of inserting the power supply device 3 directly into the expansion notch 111 of the notebook computer 1, it is connected to the notebook computer 1 by means of an electrical receptacle 33 formed at a suitable position thereof for receiving a connecting wire means 34 which may fit into a corresponding power receptacle 113 in the body 11 of the notebook computer 1. The replicator 4 may hence be inserted into the expansion notch 111 of the notebook computer 1. The expansion device 5 may be joined to the notebook computer 1 in the same manner with the power supply device 3 separately connected to the notebook computer 1.

Although the present invention has been illustrated and described with reference to the preferred embodiment thereof, it should be understood that it is in no way limited to the details of such embodiment but is capable of numerous modifications within the scope of the appended claims.

What is claimed is:

1. A notebook computer having insertable expansion devices and including a motherboard, a display and a keyboard, which computer comprises:

a) a computer body having a rear end, an expansion notch formed in the rear end, the expansion notch including an inner wall, an expansion connector formed in the inner wall for connection with a motherboard disposed inside the computer body; and b) an expansion connection device including a box body having a front end, a plurality of expansion units disposed within the box body, a connector at the front end of the box body for connection to the expansion connector of the computer body, a case corresponding in size to the expansion notch and extending outwardly from the front end of the box body, the case being positioned between the connector and the box body, and an electrical socket for receiving an electric plug of a power supply source.

2. The notebook computer of claim 1 wherein the plurality of expansion units includes a floppy disk drive, a hard disk, an optical disk drive, and a modem.

* * * * *